Nov. 29, 1932.    R. E. HUSTON    1,889,661
BASKET HANDLE
Filed Aug. 21, 1931
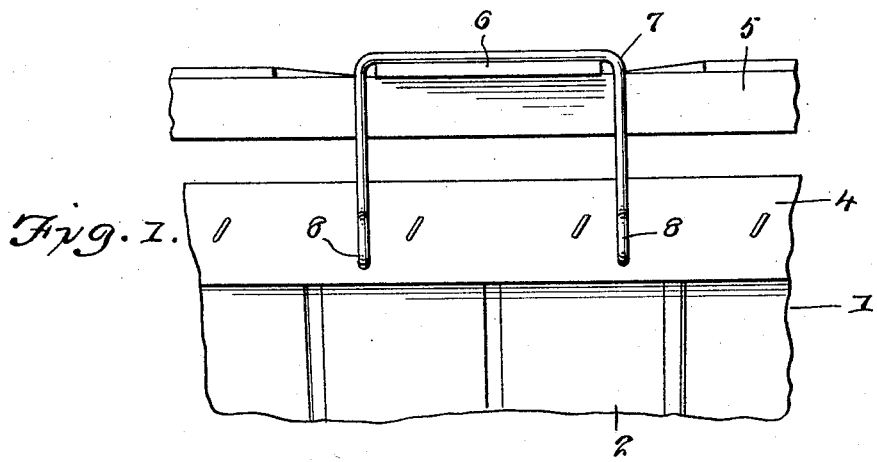
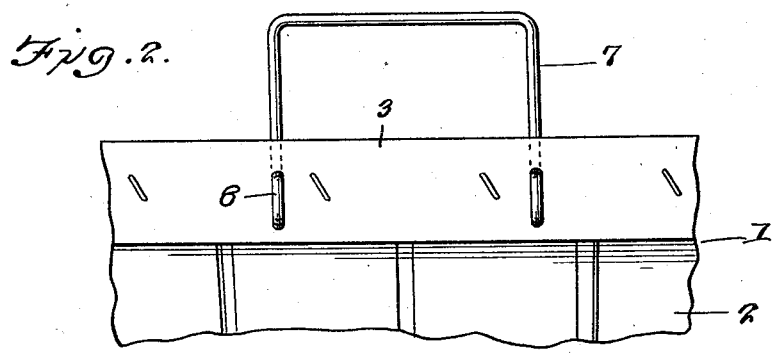
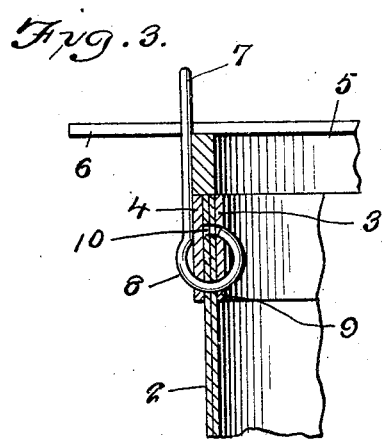
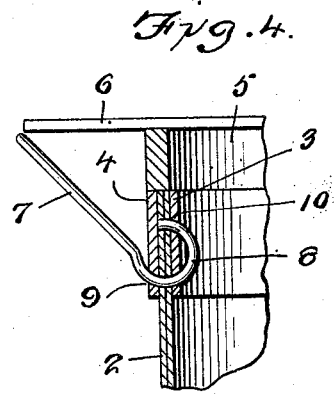
R. E. Huston
INVENTOR
BY Victor J. Evans and Co.
ATTORNEY Patented Nov. 29, 1932

1,889,661

UNITED STATES PATENT OFFICE

ROBERT E. HUSTON, OF TRINITY, TEXAS

BASKET HANDLE

Application filed August 21, 1931. Serial No. 558,581.

This invention relates to handles especially adapted for baskets and other containers having removable covers equipped with retaining elements adapted to be engaged by the handles for securing the covers in place and has for the primary object, the provision of a novel construction for attaching the handles to the basket or container which will permit the handles to readily hinge for engaging and disengaging with the retaining element of the cover and which will not present sharp ends or projections to the interior of the basket or container during the adjustment or movement of said handles and thereby obviating the possibility of injuring the contents of the basket or container or present obstructions which may injure a person when placing in or removing the contents from the basket or container.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating a handle constructed in accordance with my invention and applied to a basket and cover therefor.

Figure 2 is a similar view showing the handle connected to the basket.

Figure 3 is a detail sectional view illustrating the hinged end of the handle and with the latter in a position for securing the cover.

Figure 4 is a similar view showing the handle positioned to free the cover.

Referring in detail to the drawing, the numeral 1 indicates a fragmentary portion of a basket or container in which the sides are constructed from slats 2 secured at the upper edges by inner and outer hoops or bands 3 and 4. The basket 1 is closed by a slatted cover 5 provided with a strip 6 projecting beyond the periphery thereof for engagement with handles 7 so that the cover will be held in a position for closing the basket.

The handles 7 are of substantially U-shape so that when they are disposed vertically they will overlie the strip 6 and the ends of the handles are bent into substantially circular shaped portions 8. The inner and outer bands or hoops 3 and 4 are provided with aligned slots 9 to receive curved or semi-circular portions 8 for hingedly connecting the handles to the basket or container. The inner band or hoop 3 and also certain slats 2 are provided with openings 10 to receive the free ends of the handles either when disposed vertically or disposed angularly to the basket as shown in Figure 4, thus it will be seen that the handles are capable of being swung relative to the basket and when disposed at an inclination as shown in Figure 4, the handles are disengaged from the strip 6 of the cover and when disposed vertically they have the strip 6 extending therethrough. When the handles are in either of their positions, the ends thereof are prevented from coming in contact with the contents of the basket and further it will be noted that no sharp projections or the like are presented within the basket obviating the possibility of the contents being injured or a person being injured when removing or replacing the contents within the basket.

While I have shown and described the preferred embodiment of my invention, it will be understood that minor changes in construction, combination and arrangement of parts, may be made without departing from the spirit and scope of my invention, as claimed.

Having thus described my invention, what I claim is:

A device of the character set forth comprising a container having spaced openings in the wall thereof, a band surrounding the container and closing one of the openings and having an opening aligning with the other opening of the container, and a handle having a semi-circular shaped portion extending through the aligned openings of the band and the container with the end of said semi-circular portion movable in the other opening of the container and adapted to abut the band for limiting the movement of the handle away from the container and always occupying a position within the last named opening regardless of the inclination of the handle relative to the container.

In testimony whereof I affix my signature.

ROBERT E. HUSTON.